Patented Oct. 11, 1932

1,882,081

UNITED STATES PATENT OFFICE

ARCHIE R. KEMP, OF WESTWOOD, NEW JERSEY, ASSIGNOR TO BELL TELEPHONE LABORATORIES, INCORPORATED, OF NEW YORK, N. Y., A CORPORATION OF NEW YORK

INSULATING ADHESIVE

No Drawing.   Application filed May 14, 1930.  Serial No. 452,518.

This invention relates to cables insulated with natural gums such as gutta percha, balata, or substitutes therefor, and more particularly to an improvement in compositions to be applied between layers of plastic insulation to cause the layers to adhere more firmly to each other, or applied to the conductor for filling and to promote adhesion of the insulation thereto.

In cable manufacture it is customary to apply insulation, especially upon deep sea signaling cables, in several layers which are cemented together by a compound known as Chatterton's compound. A typical specimen of Chatterton's compound as used in the past consists of about 70% Stockholm tar mixed with 30% gutta percha. Occasionally colophony or rosin is included in Chatterton's compound. Typical compositions of Chatterton's compound, with or without rosin have a large leakance, a large dielectric constant, and large ratio of specific conductance to capacity. Such electrical properties have not heretofore been especially important in low frequency signaling cables and with types of insulation heretofore employed. However, with higher telegraph frequencies and especially with speech frequencies the necessity for an adhesive with better electrical properties between the layers of insulation has arisen. Furthermore, improvements in insulation have increased the contrast between the properties of the insulation and of the adhesives used heretofore. For this reason the advantage to be obtained with an adhesive of superior electrical properties is increased.

In order to accomplish the objects of the present invention use is made of adhesive compositions composed of polymerized cyclic terpene hydrocarbons, especially dipolymers thereof, mixed with natural gums of composition $(C_5H_8)_n$ such as gutta percha, balata, rubber, or synthetic substitutes therefor. In particular, superior results have been obtained with the use of 50 to 75% washed or deresinated balata combined with 50 to 25% of a composition known as "Dipolymer" prepared in accordance with the disclosure of one or more of the U. S. patents to Humphrey, Nos. 1,691,065, 1,691,067, 1,691,068, 1,691,069 and 1,691,573, all granted on November 13, 1928. In general similar results may be obtained by employing polymers, and especially dipolymers, of dipentene, turpentine, pine oil, or other terpene hydrocarbons or substances rich in cyclic terpene hydrocarbons.

As pointed out in one or more of the Humphrey patents mentioned above, the product resulting from heating pine oil for example, can be separated into several fractions. The fraction most useful for the purposes of the present invention is that 80% of the material which boils off first and has a specific gravity of about 0.94. However, the invention is not limited to the use exclusively of this fraction of the material.

In preparing compositions in accordance with the invention the ingredients may be compounded either by stirring them together at 150° C., or by milling them on a slightly warmed rubber mill. Mixtures containing washed balata may be successfully prepared by stirring at 150° C., while those containing deresinated balata are preferably mixed on the rubber mill or in an internal mixer as otherwise they become spongy and lose their toughness. The consistency of the material may be controlled over a considerable range by varying the amount of dipolymer and the time of milling. A composition which has at 80° F. a consistency quite like that of Chatterton's compound as heretofore used, is easily produced.

The electrical properties of compositions of this type at ordinary room temperature and 2000 cycles per second have been determined to be far superior to those of Chatterton's compound as previously employed. This is indicated in the following table:

Table

| | Per cent | Specific conductance in Mhos per cm³ | $\frac{G}{C}$ | Dielectric constant (K) |
|---|---|---|---|---|
| Composition No. 1 | | | | |
| Deresinated balata | 70 | | | |
| Dipolymer | 30 | $1.75 \times 10^{-12}$ | 7.9 | 2.5 |
| Composition No. 2 | | | | |
| Deresinated balata | 75 | | | |
| Dipolymer | 25 | $1.84 \times 10^{-12}$ | 8.3 | 2.5 |
| Composition No. 3 | | | | |
| Washed balata | 75 | | | |
| Dipolymer | 25 | $3.43 \times 10^{-12}$ | 15.5 | 2.5 |
| Composition No. 4 | | | | |
| Washed balata | 50 | | | |
| Dipolymer | 50 | | 17.9 | |
| Composition No. 5 | | | | |
| Stockholm tar | 70 | | | |
| Gutta percha | 30 | $162 \times 10^{-12}$ | 556 | 3.3 |

The symbol G given above represents the conductance and C the capacitance. As indicated in the above table, the electrical properties of compositions containing "dipolymer" are much superior to those of the typical Chatterton's compound composition.

As stated above, one may use in the place of balata either washed or deresinated gutta percha, crude or deproteinized rubber, balata-like derivatives of rubber (artificial balata) prepared by treating rubber with sulphuric acid or sulphonic acid derivatives in accordance with the method of Fisher's U. S. Patent No. 1,605,180, granted November 2, 1926, or mixtures of these substances. Rosin or colophony is not included.

What is claimed is:

1. An adhesive composition especially adapted for application between layers of plastic insulation upon sub-aqueous electrical conductors, characterized in this, that the composition consists of a polymerized cyclic terpene hydrocarbon, more especially a dipolymer, mixed with a gum (including natural gum and synthetic substitutes therefor) composed largely of hydrocarbon of composition $(C_5H_8)_n$.

2. A composition in accordance with claim 1 in which the gum consists principally of the hydrocarbon of gutta percha and balata.

3. A composition in accordance with claim 1, characterized in this that the gum consists of deresinated balata.

4. A composition in accordance with claim 1, characterized in this that the gum includes a proportion of rubber.

5. A composition in accordance with claim 1, characterized in this that the gum consists of any proportion of artificial balata.

6. A composition in accordance with claim 1, characterized in this that the polymerized hydrocarbon consists of polymerized turpentine or pine oil.

In witness whereof, I hereunto subscribe my name this 8th day of May, 1930.

ARCHIE R. KEMP.